United States Patent [19]
Okuda

[11] Patent Number: 6,049,423
[45] Date of Patent: Apr. 11, 2000

[54] REAR PROJECTION SCREEN INCLUDING A LENTICULAR LENS WITH CLEAR AND DIFFUSING LAYERS ON LIGHT RECEIVING AND EMITTING SIDES, RESPECTIVELY

[75] Inventor: Seiichi Okuda, Shinjuku-Ku, Japan

[73] Assignee: Dai Nippon Printing Co., Ltd., Japan

[21] Appl. No.: 09/115,180

[22] Filed: Jul. 14, 1998

[30] Foreign Application Priority Data

Jul. 14, 1997 [JP] Japan .................................. 9-188569

[51] Int. Cl.⁷ .................................................. G03B 21/60
[52] U.S. Cl. ............................................ 359/453; 359/456
[58] Field of Search ................................ 359/452, 453, 359/460, 443, 455, 456

[56] References Cited

U.S. PATENT DOCUMENTS

| | | | |
|---|---|---|---|
| 4,490,010 | 12/1984 | Honda et al. ............................ | 350/128 |
| 4,993,806 | 2/1991 | Clausen et al. ......................... | 350/128 |
| 5,058,989 | 10/1991 | Sakunaga et al. ....................... | 359/455 |
| 5,196,960 | 3/1993 | Matsuzaki et al. ...................... | 359/453 |
| 5,448,401 | 9/1995 | Takuma et al. .......................... | 359/456 |
| 5,457,572 | 10/1995 | Ishii et al. ................................ | 359/457 |
| 5,668,662 | 9/1997 | Magocs et al. .......................... | 359/452 |
| 5,760,955 | 6/1998 | Goldenberg et al. .................... | 359/456 |
| 5,880,887 | 3/1999 | Goto ........................................ | 359/626 |

*Primary Examiner*—Safet Metjanic
*Assistant Examiner*—Christopher Mahoney
*Attorney, Agent, or Firm*—Parkhurst & Wendel, L.L.P.

[57] ABSTRACT

A rear projection screen includes a lenticular lens sheet integrally having a clear layer not containing any diffusing agent, disposed on a light receiving side and having a plurality of lenticular lenses arranged in rows, and a diffusing layer containing a diffusing agent, disposed on a light emitting side and having a plurality of lenticular lenses arranged in rows. The ratio in thickness of the diffusing layer to the lens sheet is in the range of 50% to 70%. The rear projection screen disperses G-light rays traveling perpendicularly through the rear projection screen to a higher degree than light rays of other colors to reduce the gain in order that the uniformity of light intensity distribution on the surface of the rear projection screen as viewed from a position directly in front of the rear projection screen is improved.

4 Claims, 13 Drawing Sheets

REAR PROJECTION SCREEN INCLUDING A LENTICULAR LENS WITH CLEAR AND DIFFUSING LAYERS ON LIGHT RECEIVING AND EMITTING SIDES, RESPECTIVELY

BACKGROUND OF THE INVENTION

1. Field of the Invention

The present invention relates to a rear projection screen for a rear projection television system in which the picture is projected from the rear side of the rear projection screen for viewing from the front side of the rear projection screen. More particularly, the present invention relates to a rear projection screen suitable for use in a rear projection television system using three color light sources, i.e., red (R), green (G) and blue (B) light sources.

2. Description of the Related Art

A known rear projection screen is provided with a lenticular lens having a rear lens part and a front lens part for correcting R-light rays, G-light rays and B-light rays to improve the uniformity when the picture displayed on the rear projection screen is viewed from the front side of the rear projection screen. However, the color uniformity improving performance of this known rear projection screen, dependent on only the shape of the lenticular lenses, is not sufficiently effective. Another known rear projection screen proposed to improve the color uniformity is provided with an additional diffusive layer. However, the color uniformity improving performance of the known rear projection screen is not sufficient when the ratio in thickness of the diffusive layer to the screen is about 20%.

Accordingly, it is an object of the present invention to provide a rear projection screen capable of effectively improving the color uniformity of the picture as viewed in a direction perpendicular to the front surface of the screen by diffusing the G-light rays which travel through the rear projection screen in a direction perpendicular to the front surface of the rear projection screen to a greater degree than the R- and B-light rays which travel through the rear projection screen at angles other than right angles to the front surface of the rear projection screen to reduce the gain of the G-light rays.

SUMMARY OF THE INVENTION

According to a first aspect of the present invention, a rear projection screen is provided with a lens sheet disposed on a light receiving side, and having a single or a plurality of lens surfaces for condensing incident light rays, wherein the lens sheet comprises a clear layer not containing any diffusing agent, disposed on the light-receiving side of the lens sheet and serving as a light receiving layer of the lens sheet, and a diffusing layer containing a diffusing agent, disposed on the light emitting side of the lens sheet, and the ratio in thickness of the diffusing layer to the thickness of the lens sheet is in the range of 50% to 70%.

Preferably, the thickness of the diffusing layer is the greatest in a central part of each of the lenticular lenses of the diffusing layer and decreases toward side parts of each of the lenticular lenses of the diffusing layer. The rate of decrease of the thickness of each of the lenticular lenses of the diffusing layer in a central part of each of the lenticular lenses of the diffusing layer is greater than that in side parts of each of the lenticular lenses in the diffusing layer.

The clear layer of the lens sheet may contain the diffusing agent in a diffusing agent content lower than the diffusing agent content in the diffusing layer.

The above and other objects, features and advantages of the present invention will become more apparent from the following description taken in connection with the accompanying drawings.

DESCRIPTION OF THE PREFERRED EMBODIMENTS

Figure 1:
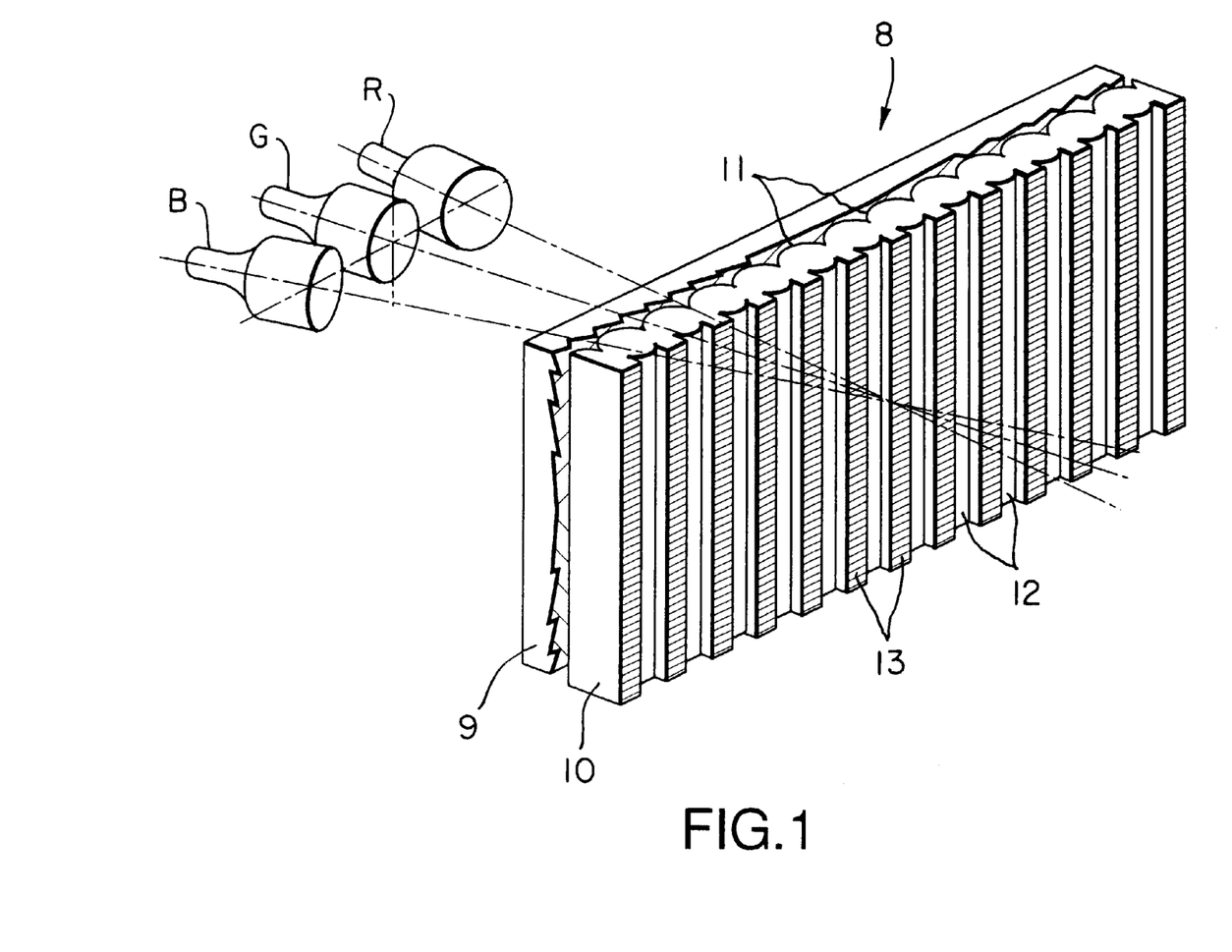
FIG. 1 is a perspective view of a rear projection screen in a preferred embodiment according to the present invention

Referring to FIG. 1, a rear projection screen 8 in a preferred embodiment according to the present invention comprises a lenticular lens sheet 10 and a Fresnel lens sheet 9 which are in a face-to-face opposing relation. Three projection light sources R, G and B are disposed behind the Fresnel lens sheet 9 to project light rays onto the rear projection screen 7. The picture displayed on the opposite front side of the screen 8 is viewed by the viewers. The light sources R, G and B are for red, green and blue colors. The Fresnel lens sheet 9 functions to convert the rays of light coming from the light sources into parallel rays. The lenticular lens sheet 9 has lenticular lenses 11 on the rear side and light absorbing layers 13 extending vertically in parallel arrangement on the front side. Between adjacent light absorbing layers 13 is disposed a vertically extending light emitting lenticular lens 12.

Figure 2:
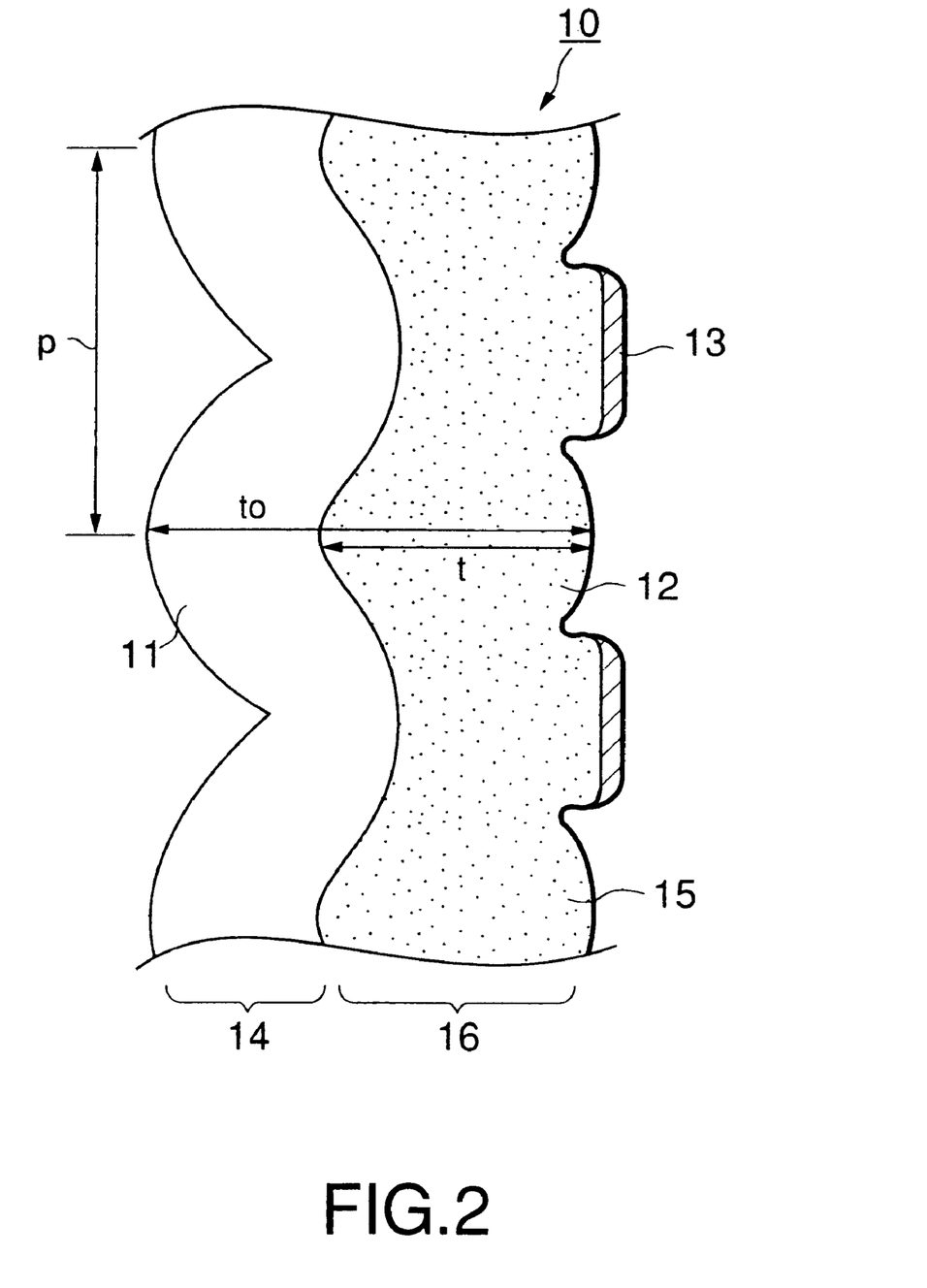
FIG. 2 is a fragmentary horizontal sectional view of a lenticular lens sheet included in the rear projection screen of FIG. 1.
Figure 3A:
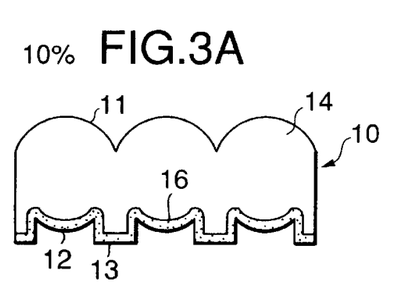
FIGS. 3A, 3B, 3C, 3D, 3E, 3F and 3G are typical sectional views of lenticular lens sheets differing from each other in the ratio of the thickness of a diffusing layer to that of the lenticular lens sheet.
Figure 3B:
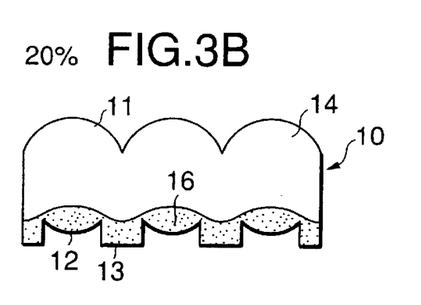
Figure 3C:
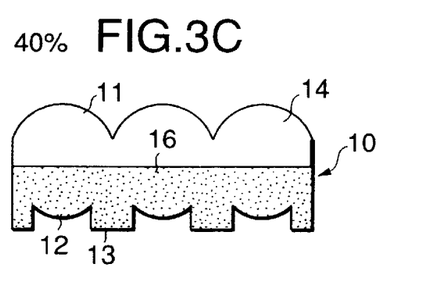
Figure 3D:
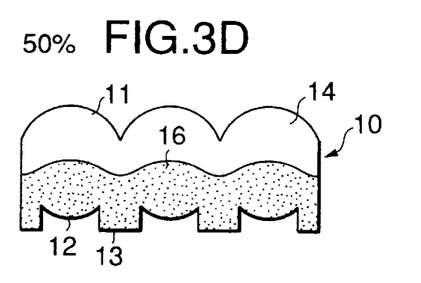
Figure 3E:
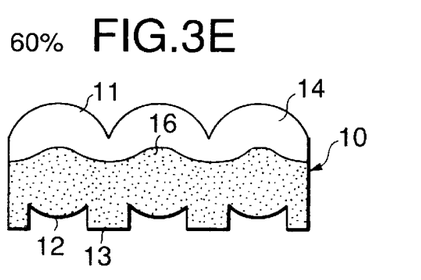
Figure 3F:
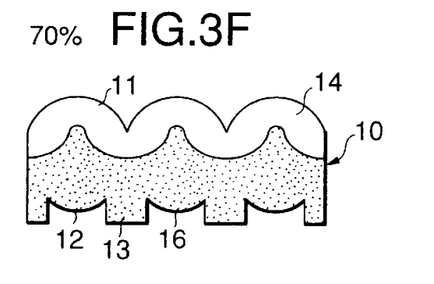
Figure 3G:
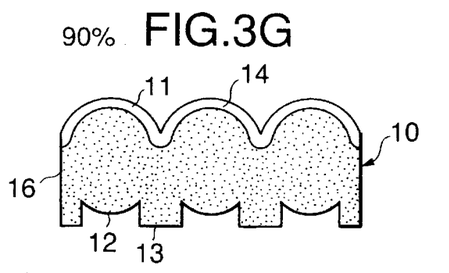

As shown in FIG. 2, the lenticular lens sheet 10 has a clear layer 14 on the rear side provided with the light receiving lenticular lenses 11. The clear layer 14 serves as a light receiving layer for condensing incident light rays. The lenticular lens sheet 10 also has a diffusing layer 16 on the front side having the light emitting lenticular lenses 12. The diffusing layer 16 serves as a light emitting layer. The light absorbing layers 13 are formed on parts of the diffusing layer 16 between adjacent lenticular lenses 12, on which the incident light rays refracted by the lenticular lenses 11 of the clear layer 14 do not fall.

In this lenticular lens sheet 10, the clear layer 14 does not contain any diffusing agent in the form of particles and serves as a light receiving layer, and the diffusing layer 16 contains a diffusing agent 15 in the form of particles. Path length subject to the influence of the diffusion of light rays is dependent on the shape of the lenticular lens sheet 10 when a diffusing agent were distributed uniformly in the lenticular lens sheet 10. The path length thus determined is not necessarily a desirable optical path length in the diffusing layer. According to the present invention, the lenticular lens sheet 10 has the clear layer 14 and the diffusing layer 16 in order that the lenticular lens sheet 10 can have a desirable optical path length.

Figure 4:
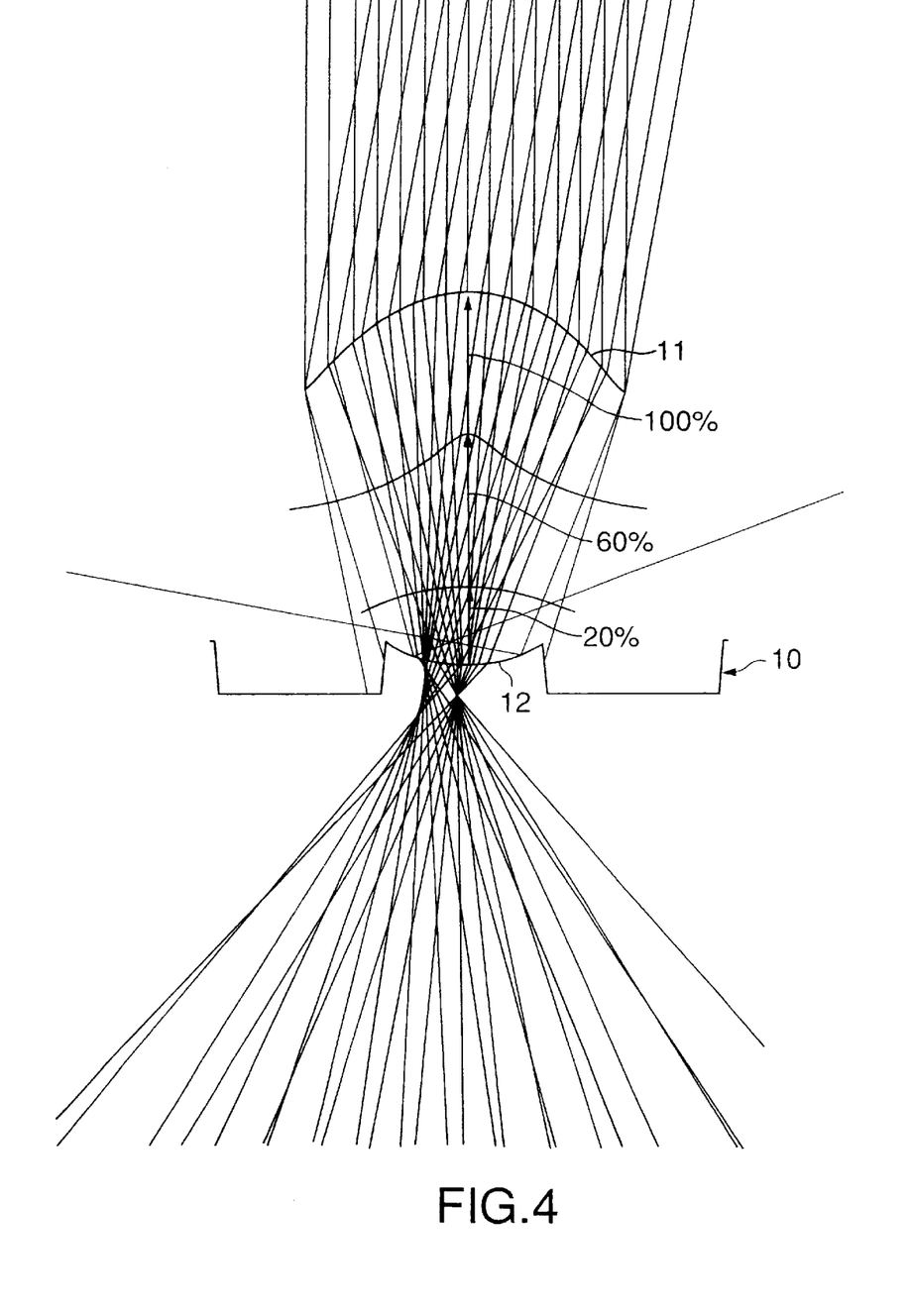
FIG. 4 is a diagrammatic view for assistance in explaining the ratio of the thickness of a diffusing layer to that of a lenticular lens sheet in the rear projection screen in the preferred embodiment of the present invention shown in FIG. 1.
Figure 5:
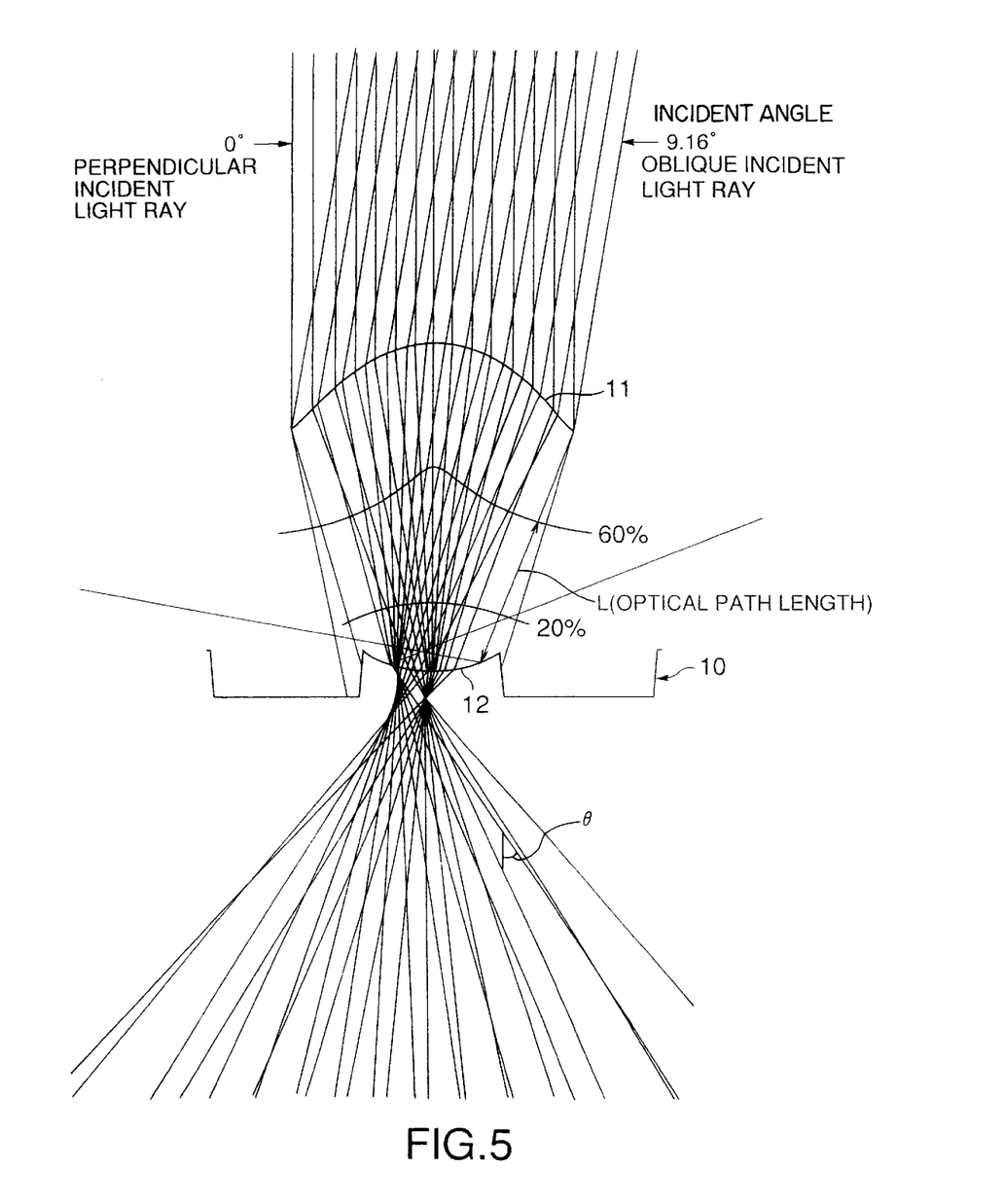
FIG. 5 is a diagrammatic view for assistance in explaining the optical path length of the diffusing layer in the rear projection screen of the present invention shown in FIG. 1.

Preferably, the ratio of the thickness t of the diffusing layer 16 to the thickness to of the lenticular lens sheet 10 is in the range of 50 to 70%. The thickness t of the diffusing layer 16 is the greatest in a part of each lenticular lens 12 of the diffusing layer 16 corresponding to the central or highest part of each lenticular lens 11 and decreases toward the side parts of each lenticular lens 12 corresponding to the sides of each lenticular lens 11 of the clear layer 14, if the protruding portions on the front side of the lenticular lens sheet 10 are disregarded. The rate of decrease of the thickness of the diffusing layer 16 is greater in the central part than in the side parts. The lenticular lens sheet 10 having the diffusing layer 16 of the thickness t equal to 50% to 70% of the thickness of the lenticular lens sheet 10 can be formed in a satisfactory front appearance by two-layer extrusion, i.e., coextrusion.

FIGS. 3A to 3G show lenticular lens sheets respectively having substantially the same external shapes, and differing from each other in the respective shapes of the clear layer 14 and the diffusing layer 16. In the lenticular lens sheets shown in FIGS. 3A to 3G, the ratio of the thickness of the diffusing layer 16 to the thickness of the lenticular lens sheet (hereinafter referred to as "diffusing layer thickness ratio") is 10%, 20%, 40%, 50%, 60%, 70% and 90%, respectively. These lenticular lens sheets are formed by two-layer extrusion, i.e., coextrusion. In the lenticular lens sheets shown in FIGS. 3D, 3E and 3F, the thickness decreasing rate in a part of the diffusing layer 16 corresponding to the central part of the lenticular lens 11 is greater than the thickness decreasing rate in the side parts of the same corresponding to the side parts of the lenticular lens 11. Thus, a surface of the diffusing layer 16 contiguous with the clear layer 14 includes downwardly convex curves as viewed in FIGS. 3D, 3E and 3F in regions corresponding to the light absorbing layers 13.

The clear layer 14 may contain the diffusing agent in a diffusing agent content far less than that of the diffusing layer 16 to stabilize extrusion process for molding the lenticular lens sheet 10.

Concrete examples of the lenticular lens sheets 10 according to the present invention will be described hereafter.

Example

A lenticular lens sheet 10 in Example 1 has a clear layer 14 and a diffusing layer 16. The clear layer 14 is provided with lenticular lenses 11 arranged successively at pitches p=0.72 mm. Each lenticular lens 11 has a cross section corresponding to a part of an ellipse having a minor axis of $2a=1.0$ mm and a major axis $2b=2.0$ mm. Each lenticular lens has a straight line-shaped portions from the point of 15% length of the lenticular lens pitch to each end of the lenticular lens, and has a thickness t=0.88 mm. The diffusing layer 16 is provided with lenticular lenses 12 arranged so as to correspond to the lenticular lenses 11 of the clear layer 14, respectively. Each lenticular lens 12 has a cross section corresponding to a part of a circle of a radius r=0.25 mm.

The lenticular lens sheet 10 was formed by extruding an acrylic resin having a refractive index of 1.51 (commercially available from Sumitomo chemical Co., Ltd., Japan) for forming the clear layer 14, and a mixture of the same acrylic resin and glass beads having a refractive index of 1.535 of 17 µm in average particle size for forming the diffusing layer 16 by a coextrusion process using an extruder. The extrusion rates of the extruder at which the acrylic resin and the mixture of the acrylic resin and the glass beads are extruded, respectively, were adjusted so that the diffusing layer thickness ratio, i.e., the ratio of the thickness of the diffusing layer 16 to that of the lenticular lens sheet, is 60%. The diffusing agent content of the diffusing layer 16 was adjusted so that the central gain is 4.0±0.1. The optical characteristics of the lenticular lens sheet 10 was measured by a microdeflection luminance meter.

Simulation with Examples 2 and 3 and
Comparative Examples 1 and 2

Lenticular lenses 10 respectively provided with diffusing layers 16 of diffusing layer thickness ratios of 60%, 20%, 0% and 100%, respectively, were subjected to simulation. FIGS. 8, 9, 10 and 11 show the results of simulation of the performance of Example 2, Example 3, Comparative example 1 and Comparative example 2, respectively.

In the simulation, light rays were projected so as to fall on each of the lenticular lenses 11 on the light receiving side of each of Example 2, Example 3, Comparative example 1 and Comparative example 2 at incident angles of 0° and 9.16° (The angle is an example of the angle of concentration, which is an angle between the optical axis of the G-light source and the optical axis of the R-light source or B-light source.), and optical path lengths L of optical paths along which the light rays travel through the diffusing layer 16 were determined.

Figure 6:
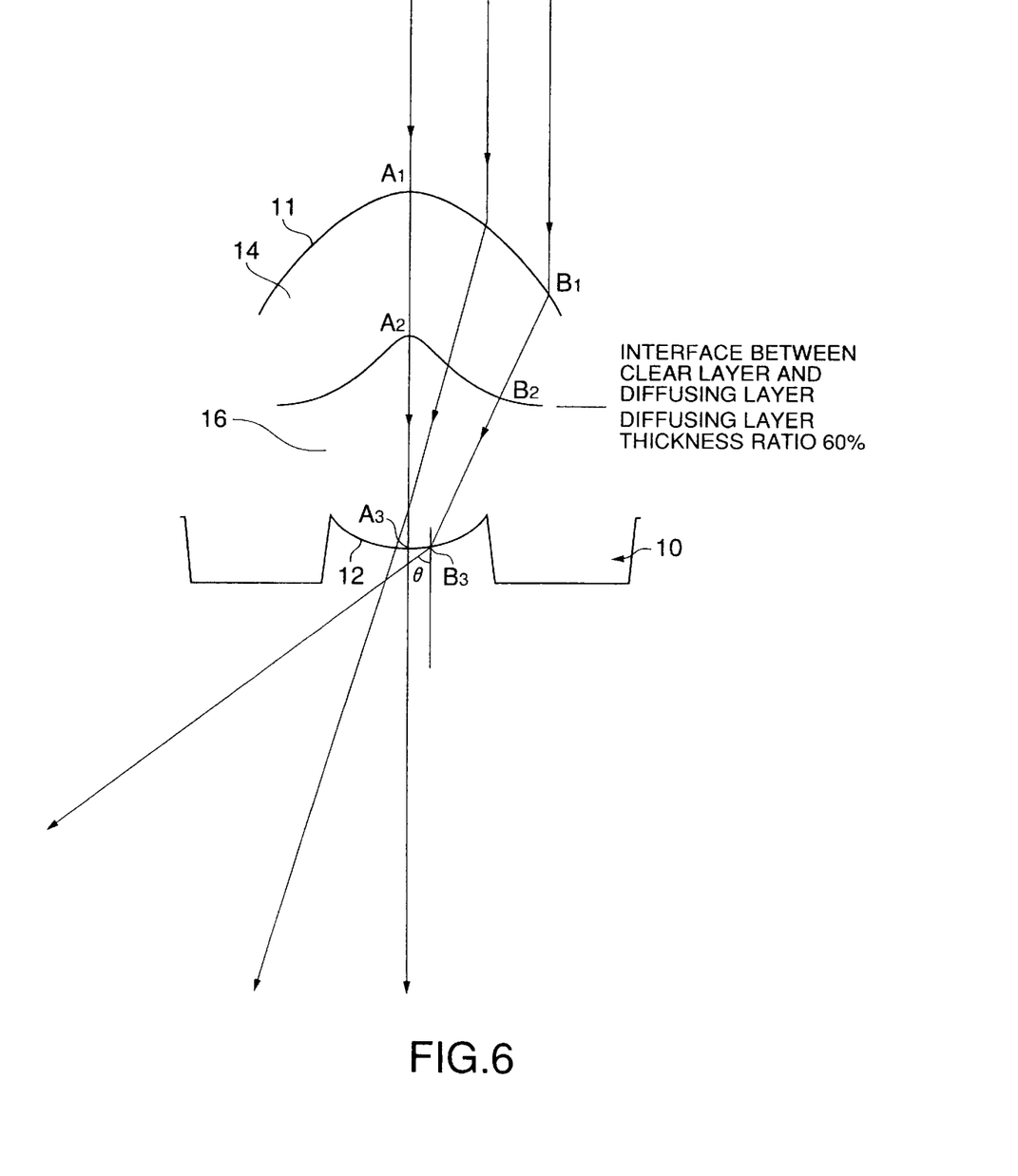
FIG. 6 is a diagrammatic view showing three G-light rays among G-light rays falling on the lenticular lens sheet in a direction perpendicular to the rear projection screen.

FIG. 6 shows three G-light rays among G-light rays (light rays falling on the lenticular lens sheet at an incident angle of 0°). As shown in FIG. 6, the G-light ray a falls on the lenticular lens sheet 10 at a position corresponding to the center of the lenticular lens sheet 10, while the G-light ray b falls on the same at a position other than the center. The G-light ray a intersects the three curves, i.e., the G-light ray a intersects the lenticular lens 11, the interface between the clear layer 14 and the diffusing layer 16, and the lenticular lens 12 at intersections $A_1$, $A_2$ and $A_3$, respectively.

Similarly, the G-light ray h intersects the lenticular lens 11, the interface between the clear layer 14 and the diffusing layer 16, and the lenticular lens 12 at intersections $B_1$, $B_2$ and $B_3$, respectively.

The G-light rays a and b are subject to the effect of the diffusing agent while the same travel from $A_2$ to $A_3$ and from $B_2$ to $B_3$, respectively. The longer the distances between $A_2$ and $A_3$ and between $B_2$ and $B_3$, the greater the light intensity attenuating effect of the diffusing agent on the G-light rays a and b. The G-light ray b leaves the lenticular lens 12 in a direction at a leaving angle θ to the optical axis of the lenticular lens 12. Therefore, the intensity of the G-light ray b leaving the lenticular lens 12 in a direction at the leaving angle θ to the optical axis of the lenticular lens 12 is lower than that of the G-light ray a leaving the lenticular lens 12 in a direction aligned with the optical axis of the lenticular lens 12 by a factor of (Segment $B_2$–$B_3$) (Segment $A_2$–$A_3$).

Figure 12:
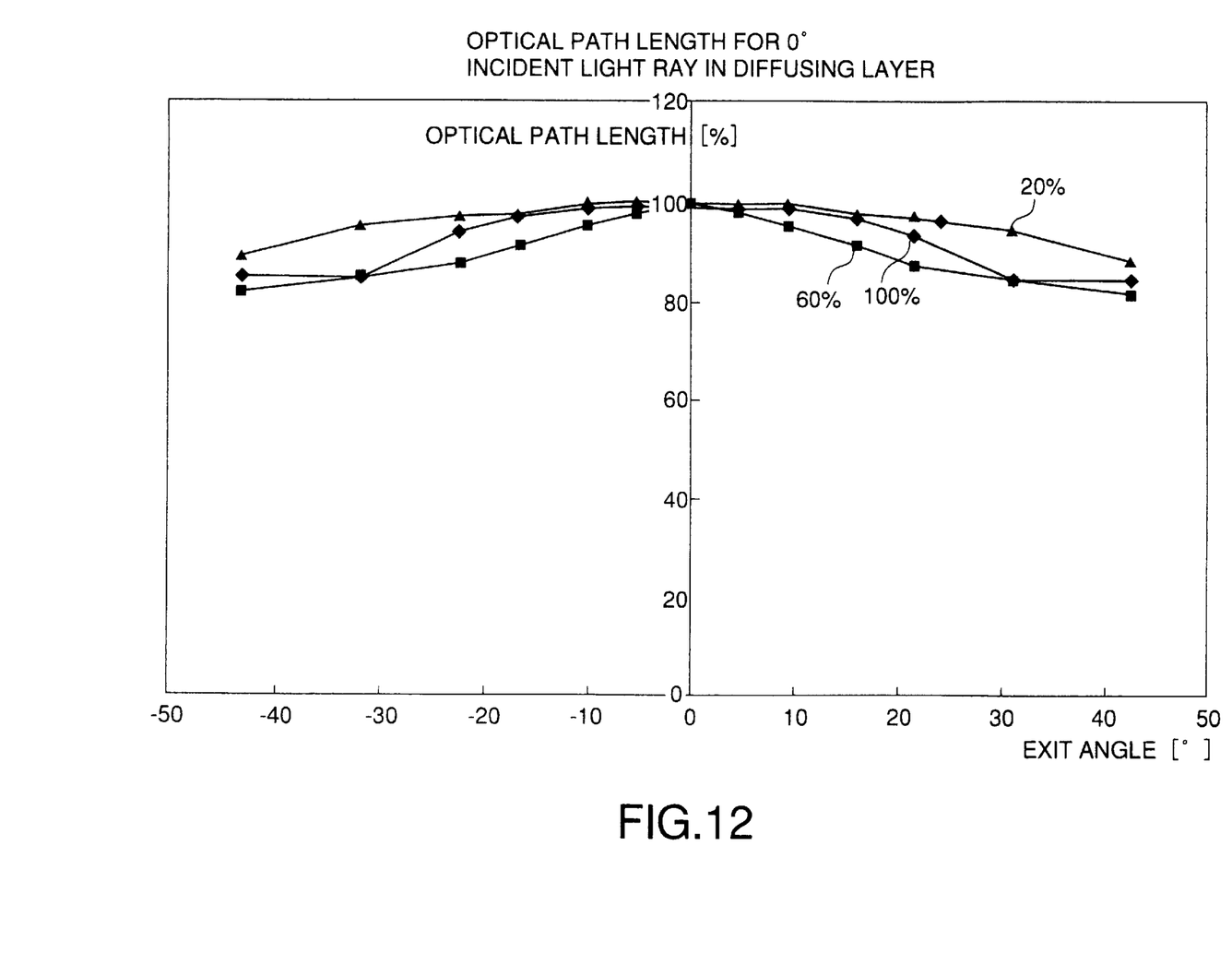
FIG. 12 is an optical characteristic diagram showing the variation of the optical path length with viewing angle in the rear projection screens in the examples and the comparative examples when the angle of incidence of light rays is 0°.

FIG. 12 shows curves indicating the variation of the ratios (Segment $B_2$–$B_3$)/(Segment $A_2$–$A_3$) of all light rays shown in FIG. 6, falling on the lenticular lens 11 at an incident angle 0° and leaving the lenticular lens 12 at the angle θ.

Figure 13:
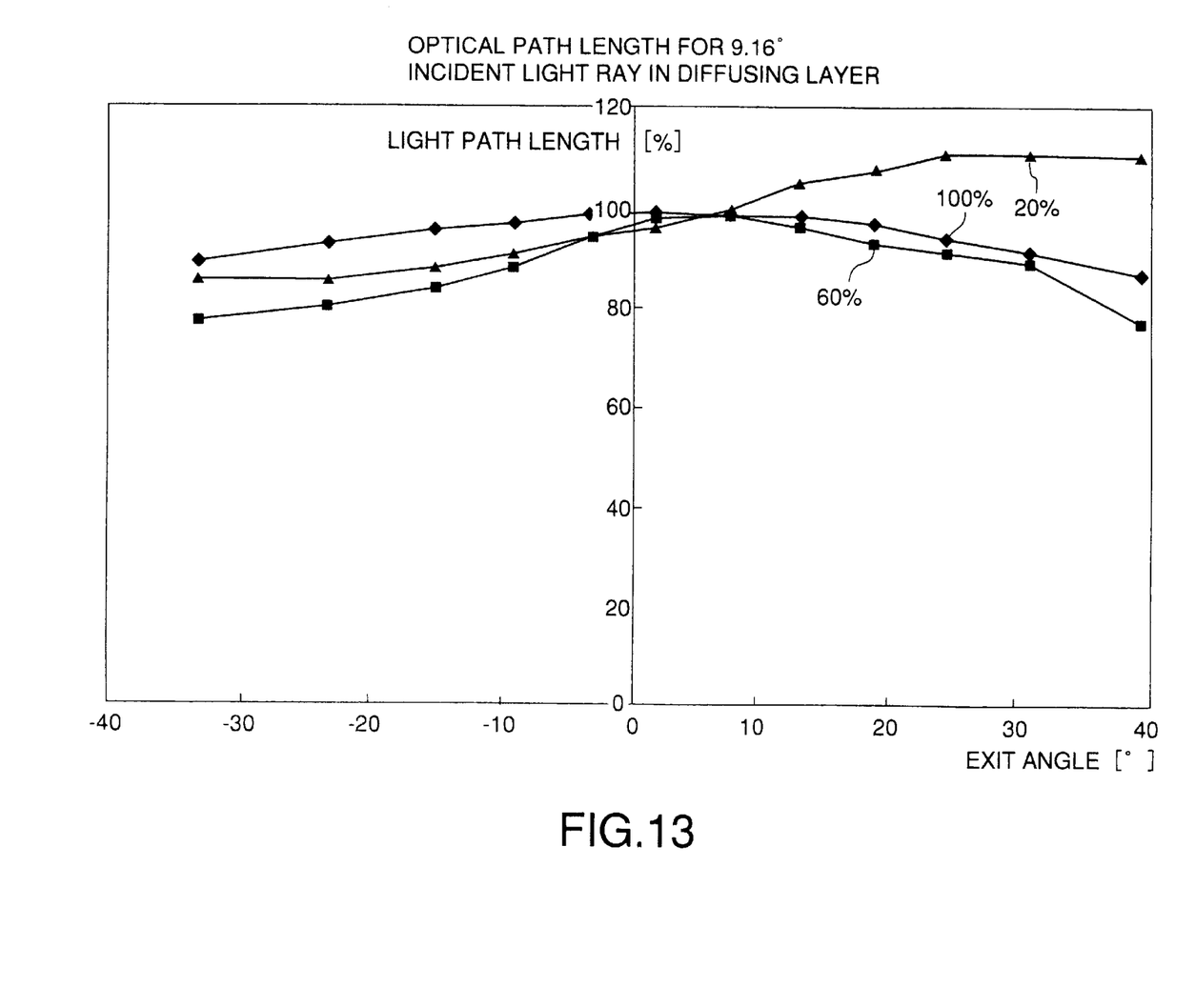
FIG. 13 is an optical characteristic diagram showing the variation of the optical path length with viewing angle in the rear projection screens in the examples and the comparative examples when the angle of incidence of light rays is 9.16°.

FIG. 13 shows curves indicating the variation of the ratios (Segment $B_2$–$B_3$)/(Segment $A_2$–$A_3$) of all light rays shown in FIG. 6, falling at an incident angle 9.16° and leaving the lenticular lens 12 at the leaving angle θ. The length of the segment $A_2$–$A_3$ used for calculating the curves shown in FIG. 13 is the same as that used for calculating the curves shown in FIG. 12.

The light diffusion characteristic diagram of the Examples and the Comparative Examples are culculated by the following expression:

(Simulated G-light gain of each angle)=(Simulated G-light gain of each angle of lenticular lens with a diffusing layer thickness ratio of 0% (shown in FIG. 10))* (2-(ratios(segment B2–B3)/(segment A2–A3) of all light rays falling on the lenticular lens 11 at an incident angle of 0° and leaving the lenticular lens 12 at each angle))

(Simulated R or B-light gain of each angle)=(Simulated R or B-light gain of each angle of lenticular lens with a diffusing layer thickness ratio of 0%.)* (2-(ratios (segment B2–B3)/(segment A2–A3) of all light rays falling on the lenticular lens 11 at an incident angle of 9.16° and leaving the lenticular lens 12 at each angle))

The expression shows the effect of increase in gain on decrease in optical path length in the diffusing layer.

Figure 8:
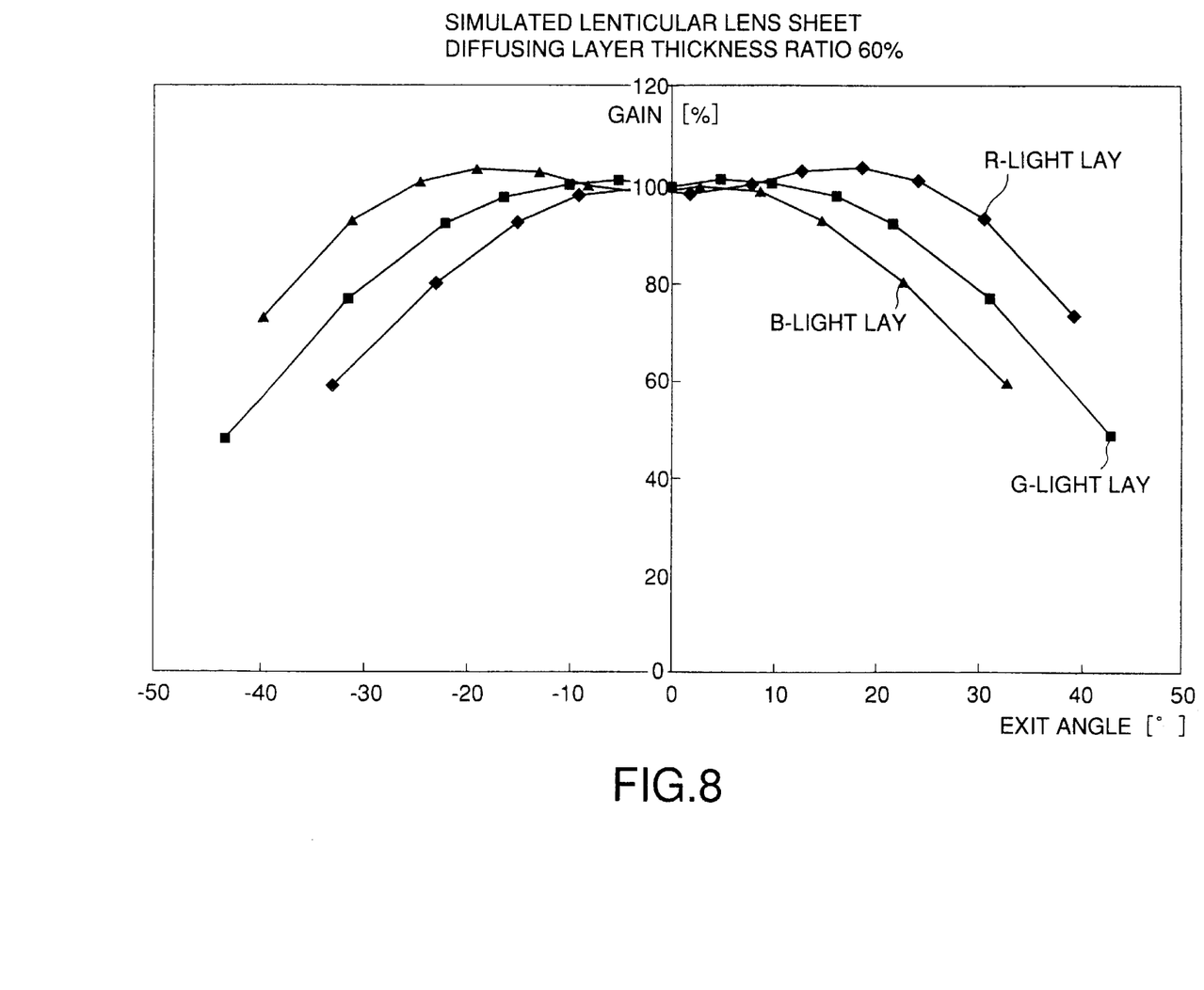
FIG. 8 is an optical characteristic diagram showing the variation of gain with viewing angle in a rear projection screen in Example 2 having a diffusing layer thickness ratio of 60%.
Figure 9:
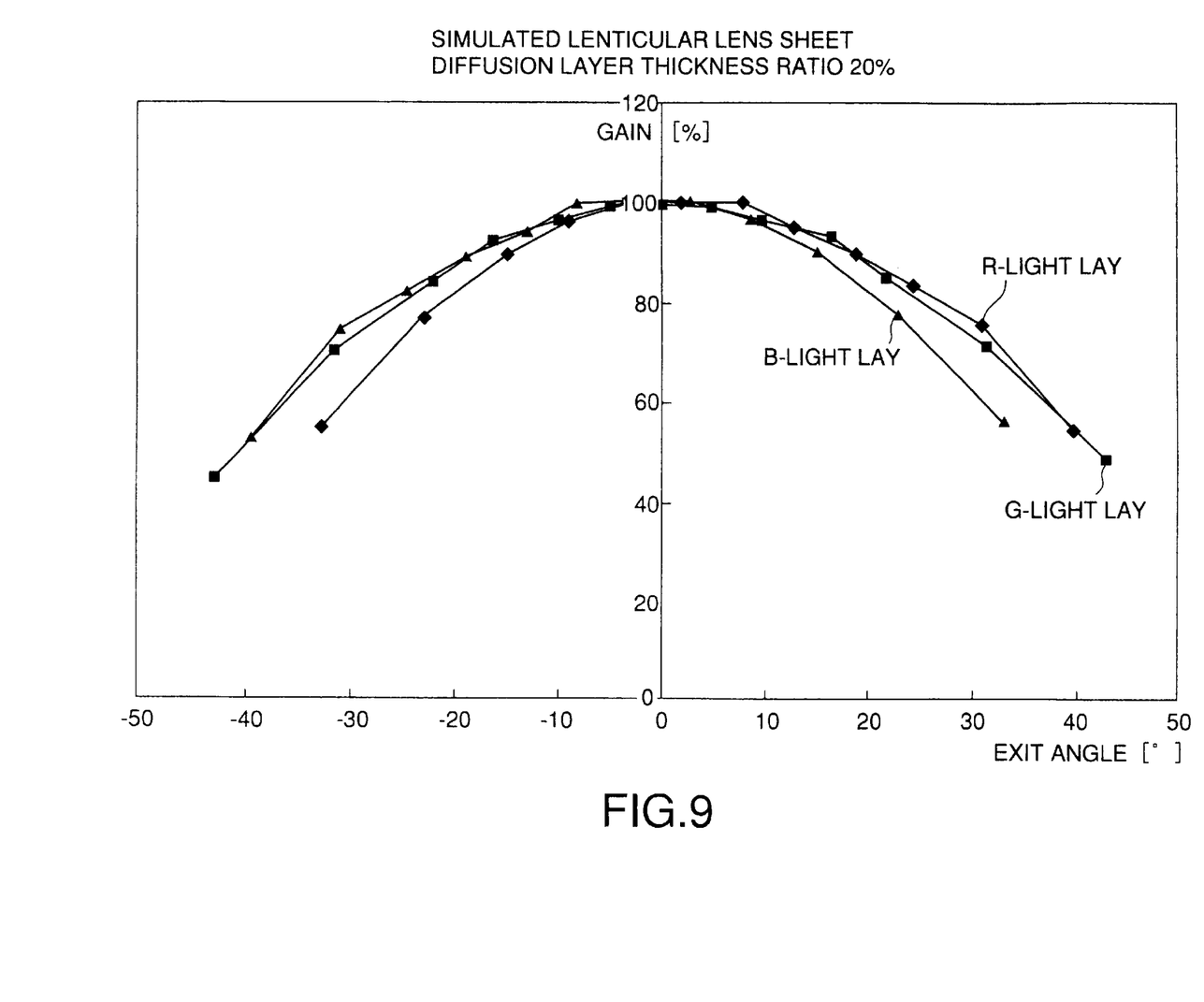
FIG. 9 is an optical characteristic diagram obtained through simulation and showing the variation of gain with viewing angle in a rear projection screen in Example 3 having a diffusing layer thickness ratio of 20%.
Figure 11:
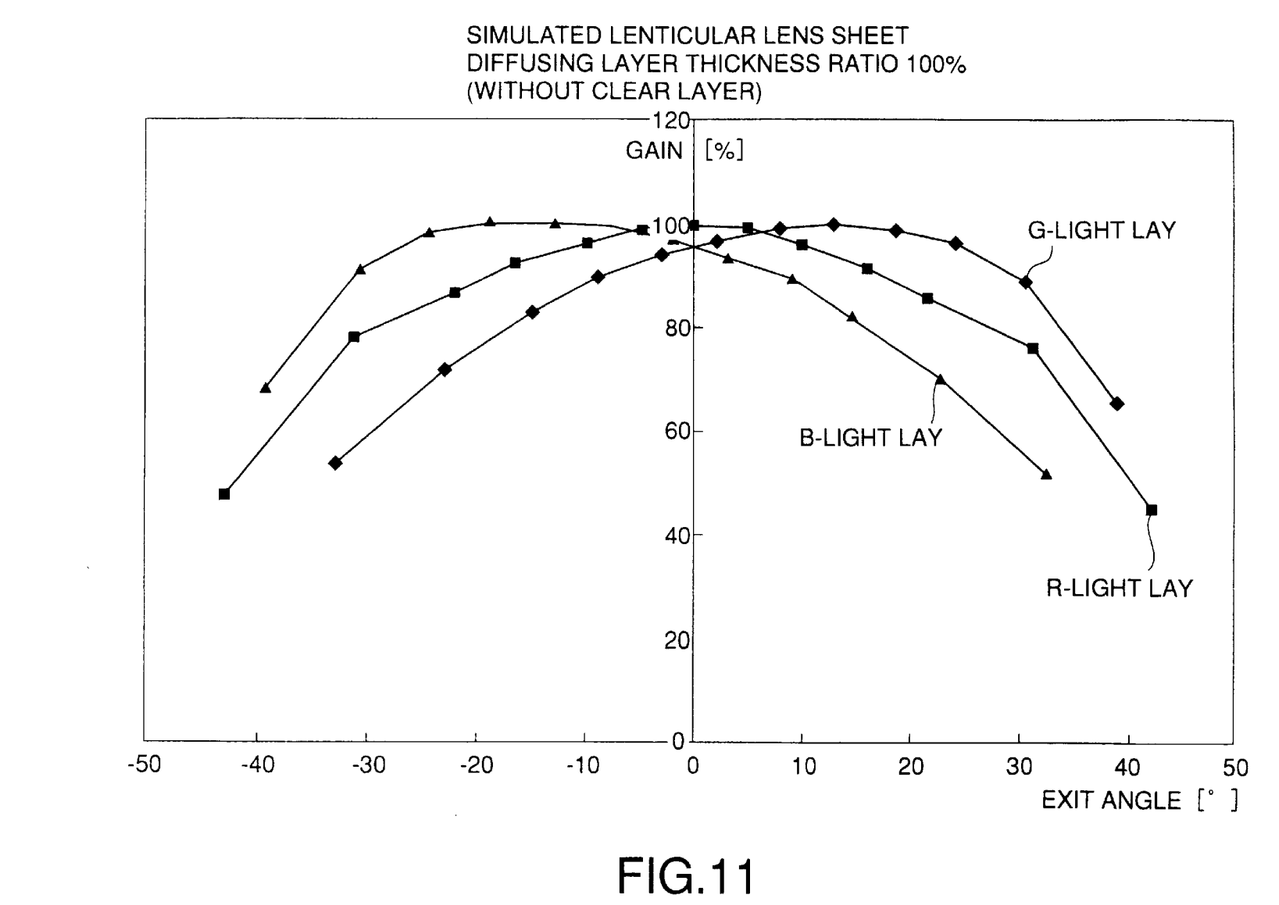
FIG. 11 is an optical characteristic diagram obtained through simulation and showing the variation of gain with viewing angle in a rear projection screen in Comparative Example 2 having a diffusing layer thickness ratio of 100%.

FIGS. 8, 9 and 11 show the results of simulation of the light diffusing characteristics of Example 2, Example 3 and Comparative Example 2.

Results of Measurement and Simulation

Figure 7:
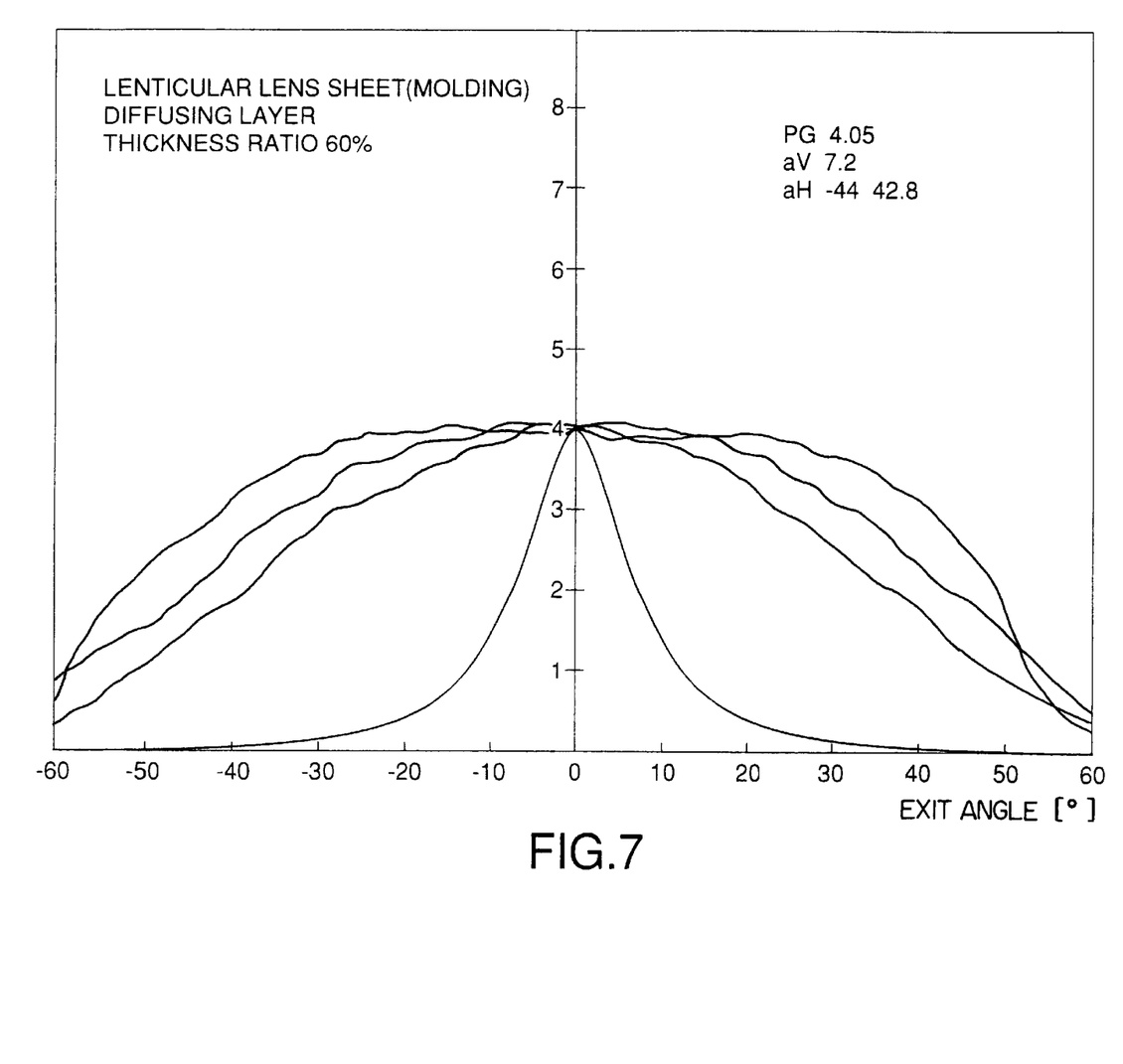
FIG. 7 is an optical characteristic diagram showing the variation of gain with viewing angle in a rear projection screen in Example 1 having a diffusing layer thickness ratio of 60%.

As is obvious from FIG. 7, the lenticular lens sheet molding) of 60% in diffusing layer thickness ratio does not cause color shift for light rays leaving the lenticular lens sheet at leaving angles in the range of −10° to +10°, and the gains for R-light rays, G-light rays and B-light rays are nearly equal to each other.

The screen of a TV set provided with this lenticular lens sheet of 60% in diffusing layer thickness ratio was excellent in luminance and color uniformity as viewed from a position directly in front of the rear projection screen.

The characteristics (FIG. 7) of the lenticular lens sheet of 60% in diffusing layer thickness ratio agreed well with those (FIG. 8) determined by simulation.

As shown in FIG. 9, the lenticular lens sheet of 20% in diffusing layer thickness ratio does not cause color shift when the same is viewed from the front. However, the lenticular lens sheet of 20% in diffusing layer thickness ratio is somewhat inferior to the lenticular lens sheet of 60% in diffusing layer thickness ratio in uniformity in gain.

Figure 10:
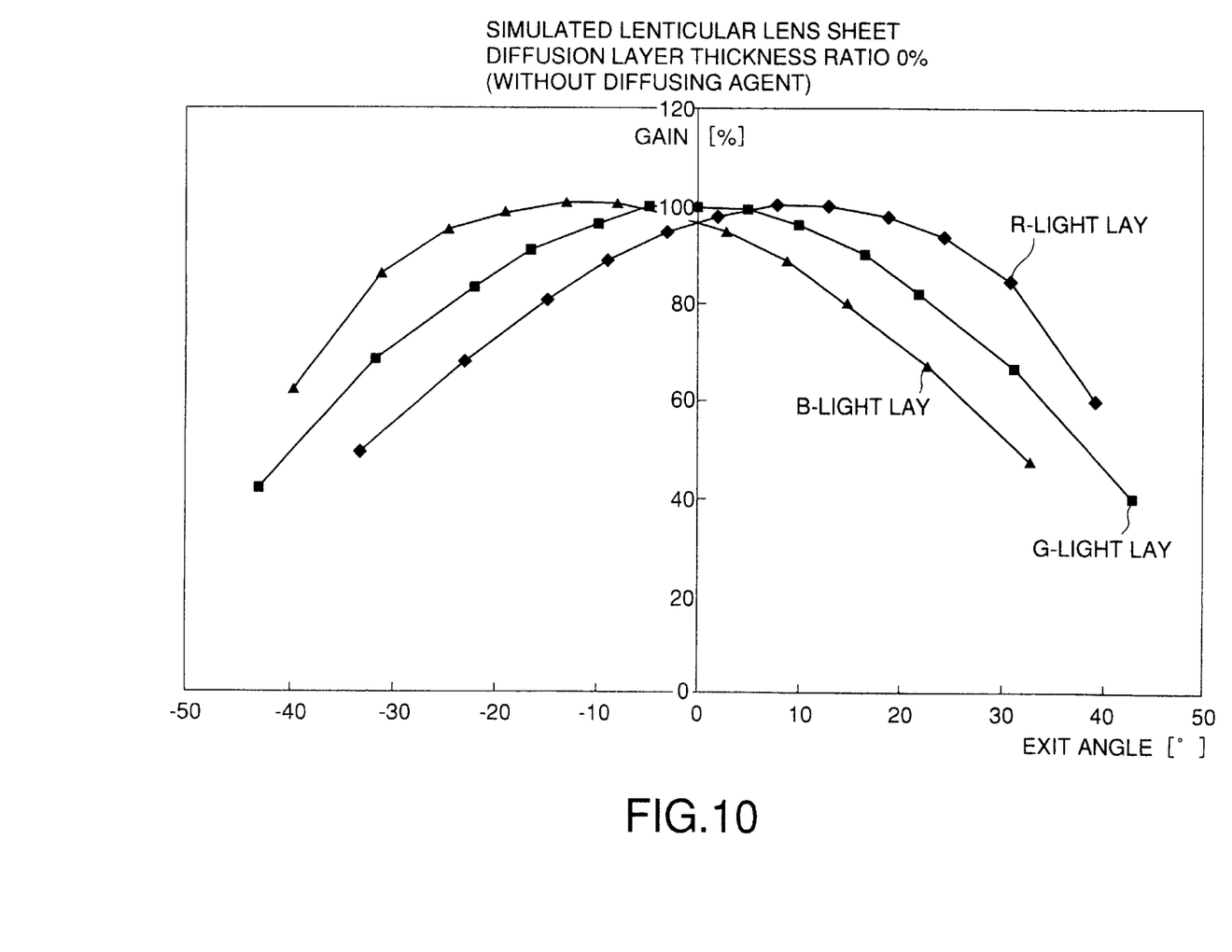
FIG. 10 is an optical characteristic diagram obtained through simulation and showing the variation of gain with viewing angle in a rear projection screen in Comparative Example 1 having a diffusing layer thickness ratio of 0%.

The characteristics of the lenticular lens sheets of 60% and 20% in diffusing layer thickness ratio were superior or to those of the simulated lenticular lens sheets of 0% (lenticular lens sheet not having any diffusing layer) and 100% (lenticular lens sheet not having any clear layer) in diffusing layer thickness ratio shown in FIGS. 10 and 11.

The lenticular lens sheet of the present invention diffuses G-light rays leaving the lenticular lens at 0° in leaving angle to a higher degree than G-light rays leaving the lenticular lens at leaving angles other than 0° and than other light rays to reduce the gain in order that the uniformity of light intensity distribution on the front surface of the rear projection screen as viewed from a position directly in front of the rear projection screen is improved.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A rear projection screen, comprising:
   a lenticular lens sheet integrally including a clear layer disposed on a light receiving side and having a plurality of lenticular lenses arranged in rows, and a diffusing layer disposed on a light emitting side and having a plurality of lenticular lenses arranged in rows;
   said clear layer being free of any diffusing agent;
   said diffusing layer comprising a diffusing agent and being disposed contiguously with said clear layer;
   said diffusing layer having a first thickness and said lenticular lens sheet having a second thickness, a ratio of said first thickness to said second thickness being from 50% to 70%; and
   said first thickness of said diffusing layer being greatest in a central part of the lenticular lenses of said diffusing layer corresponding to a central part of each of the lenticular lenses of said clear layer and decreases towards a side part of each of the lenticular lenses of said diffusing layer corresponding to the side part of each of the lenticular lenses of said clear layer.

2. A rear projection screen, comprising;
   a lenticular lens sheet integrally including a clear layer disposed on a light receiving side and having a plurality of lenticular lenses arranged in rows, and a diffusing layer disposed on a light emitting side and having a plurality of lenticular lenses arranged in rows;
   said diffusing layer including a diffusing agent and being disposed contiguously with said clear layer;
   said clear layer including a diffusing agent present in a quantity lower than the quantity of the diffusing agent in said diffusing layer;
   said diffusing layer having a first thickness and said lenticular lens sheet having a second thickness, a ratio of first thickness to said second thickness being from 50% to 70%; and
   said first thickness of said diffusing layer being greatest in a central part of each of the lenticular lenses of said diffusing layer corresponding to a central part of each of the lenticular lenses of said clear layer and decreases towards a side part of each of the lenticular lenses of said diffusing layer corresponding to the side part of each of the lenticular lenses of said clear layer.

3. The rear projection screen according to claim 1, wherein said central part of each of the lenticular lenses of said diffusing layer comprises a rate of decrease in thickness that is greater than a rate of decrease in thickness of said side parts of each of the lenticular lenses of said diffusing layer.

4. The rear projection screen according to claim 3, wherein said central part of each of the lenticular lenses of said diffusing layer comprises a rate of decrease in thickness that is greater than a rate of decrease in thickness of said side parts of each of the lenticular lenses of said diffusing layer.

* * * * *